Sept. 30, 1958
J. M. RICHARDS
2,853,919
METHOD OF TESTING EYES
Filed June 26, 1953
2 Sheets-Sheet 1
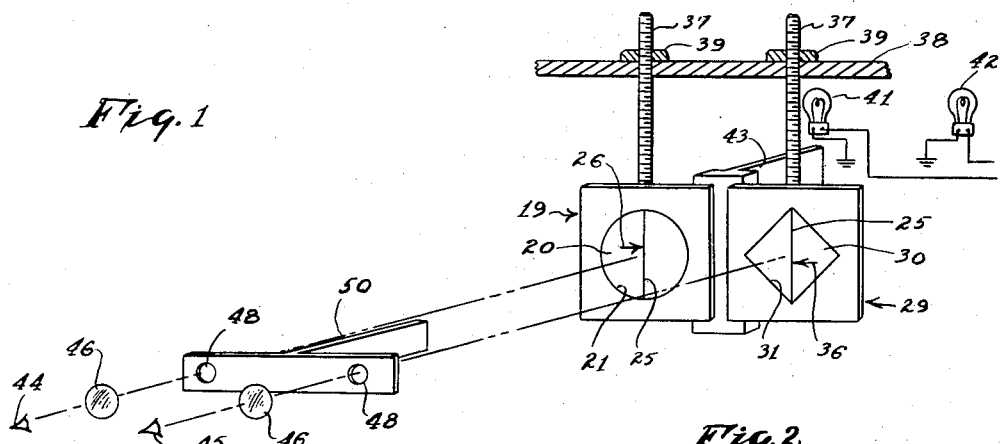
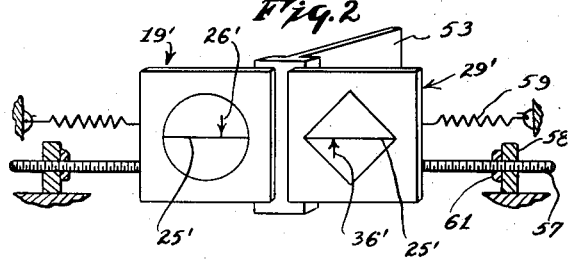
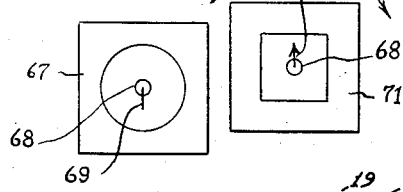
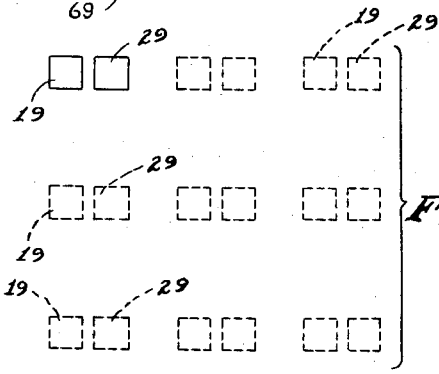
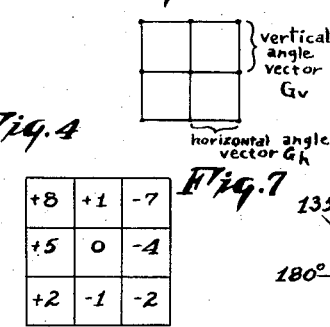
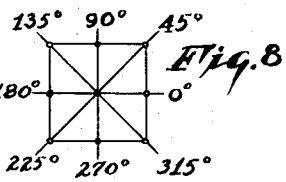
INVENTOR.
John M. Richards
BY Emery J. Varney,
Whittemore & Dix.
ATTORNEYS

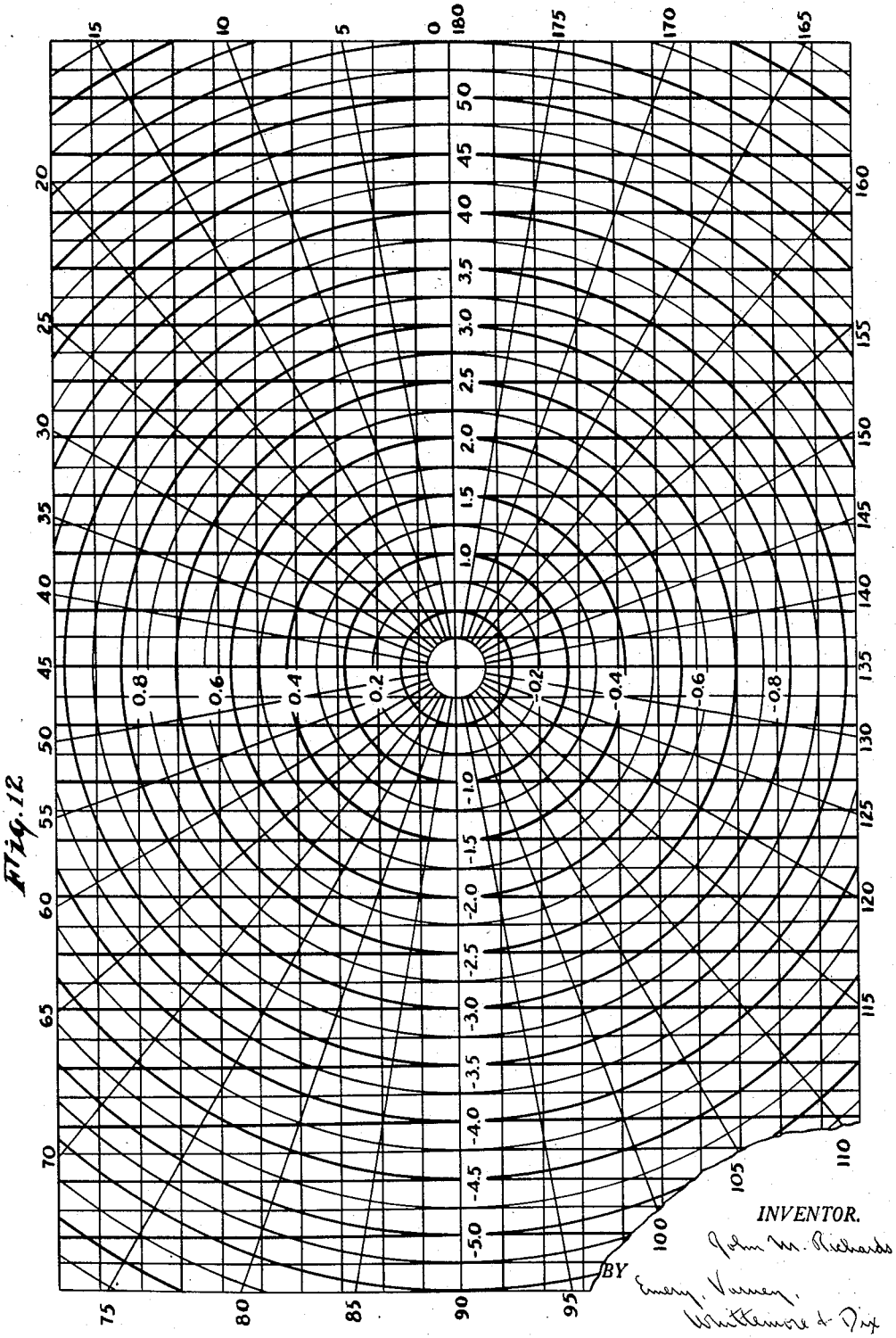

United States Patent Office 2,853,919
Patented Sept. 30, 1958

2,853,919

METHOD OF TESTING EYES

John M. Richards, Santa Barbara, Calif.

Application June 26, 1953, Serial No. 364,259

4 Claims. (Cl. 88—20)

This invention relates to the testing of a patient's eyes for tonic muscle imbalance and making of spectacle lenses for correcting the muscle imbalance.

It is an object of the invention to provide an improved method for testing the eyes to determine asymmetrical tonic muscle imbalance by testing separately for the vertical and horizontal meridians; and to obtain separate clinical data for differenet positions of gaze.

Another object of the invention is to provide lenses that compensate the muscle imbalance determined by certain correlations of the clinical data in the different positions of gaze. One feature of the invention relates to the provision of an initial prism correction for compensating imbalance in the eyes-front position, if such imbalance exists; and to the provision of an over all eikonic lens correction, preferably for a diagonal meridian in accordance with the correction span necessary after the prism correction.

Another object of the invention is to provide an eikonic lens correction in an axis which is that of greatest symmetry after one of the correction spans has been provided for by an over all eikonic lens correction.

Other objects, features and advantages of the invention will appear to be pointed out as the description proceeds.

In the drawing, forming a part hereof, in which like reference characters indicate corresponding parts in all the views:

Figure 1 is a diagrammatic, perspective view showing one way of testing the eyes for imbalance in the vertical meridian, in accordance with this invention;

Fig. 2 shows a modified apparatus for testing the eyes for imbalance in the horizontal meridian;

Fig. 3 shows targets for determining torsional imbalance;

Fig. 4 is a diagrammatic view showing the way in which tests are made in the different positions of gaze;

Fig. 5 is a diagram illustrating the angular vectors by which the different position of gaze are separated from one another;

Fig. 6 is a diagram presenting the positions of gaze in a different way than in Fig. 5 and adding illustrative examples of imbalance in the different positions;

Fig. 7 is a diagram corresponding to Fig. 6 but showing the different corrections necessary after an initial prism correction for the eyes-front position;

Fig. 8 is a diagram similar to Fig. 5 and illustrating the way in which the different meridians are indicated in the description and formulae of this invention;

Fig. 9 is a diagram similar to Fig. 7 but with the correction spans added for the different meridians;

Figure 10 is a diagram similar to Figs. 5 and 7 but showing the remaining meridional spans of an over all eikonic lens correction;

Fig. 11 is a view similar to Fig. 10 with the residual values of the different meridional spans shown in prism diopters; and Fig. 12 is a transformation graph for determining a composite correction with data obtained in accordance with one embodiment of this invention.

Fig. 1 shows a target 19 which is preferably a glass lantern slide having a translucent field 20 surrounded by a mask 21 which has a circular opening. A heavy vertical line 25 extends across the entire field 20 and there is an alignment indicator comprising an arrow 26 at one side of the line 25 and preferably spaced a slight distance from the line.

A companion target 29 is used with the target 19. The target 29 is shown as a lantern slide and it has a field 30 surrounded by a mask 31 with a rectangular opening in contrast to the circular opening of the mask 19. These masks are of different geometrical shape so as to avoid any tendency on the part of the patient to fuse any part of the margin of the field of one target with the margin of the field of the other target.

The target 29 has a heavy center line 25 which is the same as the line 25 on the target 19. When the targets 19 and 29 are in use, the patient fuses the line 25 and this fusion is in the horizontal meridian. It is a feature of the invention that the lines 25, which are the only objects common to the two targets 19 and 29, extend across the entire field of vision and have no ends which the patient can fuse, in the vertical meridian.

Since the targets 19 and 29 provide no markings or limits which the eyes can fuse in a vertical meridian, the patient's eyes remain at rest in the vertical meridian when using these targets. There is an arrow 36 on one side of the line 15 in the target 29 on the opposite side of the line from the arrow 26 of the target 19. These arrows may have different colors or other differentiating indications such as described in my Patent No. 2,634,575, issued June 30, 1953.

Each of the targets 19 and 29 is carried by a separate screw 37 extending through a support 38. There is a nut 39 threaded on each of the screws 37 for raising and lowering the targets 19 and 29 with respect to one another. Rotation of either of the nuts 39 raises or lowers its associated screw 37, depending upon the direction of rotation, and correspondingly raises or lowers the target 19 or 29 connected to the lower end of the screw.

When the targets 19 and 29 are adjusted so that their arrows 26 and 36 are at the same vertical level, they will not be seen on the same level by a patient having a vertical tonic muscle imbalance. The examiner corrects the patient's misalignment of the arrows by moving one of the targets up or down, and the extent of this movement can be measured by micrometer scales associated with the screws 37 and nuts 39. Instead of providing movable targets, substitute targets can be used as described in my Patent No. 2,463,575, or other apparatus can be used for determining the extent of the vertical muscle imbalance.

The targets 19 and 29 are illuminated by lamps 41 and 42, and there is a shield 43 for preventing either light from illuminating the other target. The patient's left and right eyes are indicated by the reference characters 44 and 45 respectively. Lenses 46 are located in front of the patient's eyes for providing any refractive or power correction which is needed. For example, the lenses 46 may be the glasses worn by the patient for refractive correction, and which do not provide for other defects such as muscle imbalance and aniseikonia. The combined defects of aniseikonia and horizontal, vertical and/or torsional tonic muscle imbalance may be termed "anisotonus."

The patient views the targets 19 and 29 through openings 48 in a mask 49 which has a shield 50 for preventing either of the eyes 44 and 45 from seeing the target 19 or 29 which is intended for the other eye. Thus the eyes are tested by displaying separate targets to the separate eyes in a condition of rest in the meridian in which they are being tested.

Figure 2 shows targets 19' and 29' which are similar to the targets 19 and 29 except that they have lines 25' extending horizontally instead of vertically, and their alignment markings 26' and 36' are located above and below the lines instead of on the right and left sides of the lines. When the targets 19 and 29 of Fig. 1 are square or provision is otherwise made for it, the targets 19' and 29' may be obtained by merely rotating the targets of Fig. 1 through 90°.

A shield 53 is located behind the targets of Fig. 2 and serves the same purpose as the shield 43 of Fig. 1. However, the motion of the targets 19' and 29' for testing eyes in the horizontal meridian, requires horizontal movement of the targets with respect to one another, and the targets are, therefore, each connected with a screw 57 which extends through a guide bearing 58.

There is a spring 59 which biases each of the targets 19' and 29' toward its guide bearing 58, and there is a nut 61, on each of the screws 57, for limiting the movement imparted to the target by the spring 59. By turning the nuts 61, one way or the other, the targets 19' and 29' are moved toward and from one another in a horizontal direction to correct any apparent misalignment caused by imbalance of the patient's eyes in the horizontal meridian.

Fig. 3 shows a target 67 with a circle 68 and a line 69 extending radially from the center of the circle. A complementary target 71 has a similar circle 68 with a line 72 extending radially from the center of the circle in the opposite direction from the line 69. To a patient with no torsional imbalance, the lines 69 and 72 will appear as a straight line. If they do not, the examiner rotates one of the targets about the center of the circle, as indicated by the arrows 74, so as to make the lines 69 and 72 appear to the patient as a straight line. The amount of rotation necessary to produce this result is a measure of the torsional imbalance of the patient's eyes.

Fig. 4 shows the different positions in which the targets 19 and 29 are placed for testing the patient's eyes in the nine cardinal positions of gaze. The targets 19 and 29 are shown in full lines in the eyes-right and up-position, orientation being as though the reader were looking at the patient thus making the patient's right correspond to the left side of the drawing. The targets are shown in dotted lines in the eight other positions of gaze in which the other clinical tests are made. In accordance with one modification of the invention tests may be made in only the eyes-front and the four other positions located in vertical and horizontal directions from the eyes-front positions. For another modification of the invention, all nine positions are tested because the correction span across the diagonal meridians is used in determining the correct lenses for the patient.

All of the tests are made while the patient's head remains in the same position so that the eyes in moving from one position of gaze to another rotate about their vertical or horizontal axes so as to obtain clinical data corresponding to the vision of the patient through the peripheral portions of the lenses which are to be supplied to correct the anisotonus.

The data obtained from the tests includes the different angles subtended by the distance of the target movement which is necessary to bring the objects on the targets into alignment at the different positions of gaze. For use in the transformation formulae, these angles are designated by the letter "D," and they are preferably converted to their equivalent in prism diopters. The subscript "f" indicates that the angle is for eyes-front position. "r" indicates eyes-right and "l" is for eyes-left. The subscript "h" and subscript "v" refer to the horizontal and vertical meridians respectively. The subscript "u" is for eyes-up and the subscript "d" is for eyes-down.

The prism correction required, also in terms of prism diopters, is the quantity $D_h$ or $D_v$ in the formulae. $P_h$ or $P_v$ is the percentage magnification of one eye in excess of the other; and "W" is the tangent of the angle of departure from the eyes-front position, symmetrically for the eyes-right or eyes-left position of gaze or for the eyes-up or the eyes-down position of gaze.

$D_f$ usually equals $D_h$. When $D_f$ is not equal to $D_h$, $D_f$ instead of $D_h$ is usually chosen for the prism prescription depending upon clinical judgment of which is preferable. For example, with convergent muscle imbalance, if $D_f$ were greater than $D_h$, $D_h$ would be used, but with a divergent tonic muscle imbalance, if $D_f$ were greater than $D_h$, $D_f$ would have to be used.

Certain sign conventions are used herein. If $P_h$ or $P_v$ represents increased magnification of the right eye as compared with the left, the sign is +; whereas if the increased magnification is of the left eye as compared with the right, the sign is —. The quantity "W" is always +. For horizontal muscle imbalance convergence is indicated by the minus sign, and divergence by the + sign. With tonic muscle imbalance sursumduction of the right eye or deorsumduction of the left eye are indicated by the + sign and sursumduction of the left eye is indicated by the — sign.

The following formulae are used for the simpler embodiment of this invention:

For horizontal tonic muscle imbalance the error of percent magnification is found by the formulae.

$$P_h = \frac{D_r - D_l}{2W}$$

while the prism error is found by the formulae:

$$D_h = \frac{D_r + D_l}{2}$$

For vertical tonic muscle imbalance the error of percent magnification is found by the formulae:

$$P_v = \frac{D_u - D_d}{2W}$$

while the prism error is found by the formulae $$D_v = \frac{D_u + D_d}{2}$$

The nine cardinal positions of gaze, indicated in Fig. 4, can be used to provide three horizontal and three vertical meridians of data which can be applied through the preceding formulae to obtain the desired errors in percent magnification difference. ($P_h$ or $P_v$) between the two eyes and/or the prism error ($D_h$ or $D_v$) in these three horizontal or vertical meridians.

In applying such data, careful clinical judgment is used to modify the final prescription. For example the usual and simplest procedure would be to select the horizontal and vertical data for the meridians including the eyes-front position which is the most important position functionally. This could be the only data considered for the final prescription (assuming the torsion error was zero), unless one of the horizontal or vertical meridians, not including the eyes-front position, had an extraordinarily large defect, which included with the other two similar meridians would give an average error substantially different from the error of the data obtained from the meridian including the eyes-front position. When such is the case the average of all three meridians can be used as the indication for clinical correction. The consideration thus far has assumed that the torsional error is zero. In such case, any indicated correction would be given in the horizontal and/or vertical meridians for the magnification error correction, and in these meridians or their resultant for the prism correction. Any power correction required by the patient has to be combined with this and torsional errors may modify some of these data. Torsional errors can be determined in accordance with my Patent No. 2,643,575, or in various other ways. In order to find out whether the patient requires a meridional correction for torsional tonic muscle imbalance, the eyes are tested with the targets adjusted to compensate for any horizontal or vertical tonic muscle imbalance.

In the simpler embodiment of this invention the composite correction is arrived at by using the data obtained for $P_h$, $P_v$ and T with the graph shown in Fig. 12. The use of the graph is as follows:

(1) Tabulate $$P_h$$
$$P_v$$
$$\text{and}$$
$$T$$

with proper regard for sign (v. s.)

(2) Calculate $P_v - P_h$ and locate the quantity on the abscissa of the graph in percent magnification.

(3) Locate T on the ordinate of the graph in degrees of torsion.

(4) Find the point $(P_v - P_h, T)$ on the graph.

(5) Read the resultant, "R," as the hypotenuse from point $(P_v - P_h, T)$ in terms of the abscissa units, reading back along the concentric lines ((R) is always +).

(6) Read directly the meridian of (R) along radius X.

(7) Calculate the over all percent magnification "O."

$$O = \tfrac{1}{2}(P_v + P_h - (R))$$

(8) Tabulate together the right eye overall percent magnification (step 7) and the meridional magnification needed to correct the torsion (step 5).

(9) Transpose this to more convenient form, for example, to coincide, if desired, with any power cylinder needed in a given patient's prescription.

A more thorough correction is obtained with this invention by providing an overall eikonic lens correction for the spans of the meridians between the different positions of gaze, and preferably the spans of the diagonal meridians. This embodiment of the invention will be described as applied to vertical anisotonus data. It will be understood that the same tests and technique can be applied to correct imbalance in the horizontal meridian. A complete correction can be made combining the vertical and horizontal anisotonus data.

Clinical judgment must be used in making lens corrections that involve composite data, however. The use of horizontal anisotonus data to obtain a meridional eikonic prescription is a meridian other than that of 180° is not usually feasible because it introduces a vertical meridional vector which usually is worse than not having the horizontal data fully corrected. Also, torsion is sometimes induced. The physiological reason that the vertical vector must be considered over the horizontal is that the fusion amplitude of the horizontal muscles is approximately ten times that of the vertical muscles.

Any torsion produced by an oblique meridional correction from either the vertical or horizontal anisotonic data must be treated in accordance with clinical judgment as to which error or what parts of both are to be corrected. Formulae given herein can be used in calculating the theoretical torsion caused by any final anisotonic prescription, and this must be balanced against actual torsion measured.

With the formulae herein the second embodiment of this invention makes it unnecessary to use the transformation graph shown in Fig. 12. The graph can be used, however, for converting one amount of torsion into another without changing the vertical or horizontal eikonic lens effect, if it becomes desirable to make a change which is not based upon calculations. As for instance, if target tilt, induced by tonic imbalance, were desired to be lessened empirically, simply and without calculations.

Various equivalent eikonic prescription arrangements may be transformed from a basic prescription, as provided by the formulae herein, without changing the effect upon the original prism diopter data. This merely gets rid of an over all correction, in whole or part, and puts it into its respective meridian, and if done with reference to the transformation graph, or to my formulae for torsion, the tilt effect of the targets can be accurately adjusted.

Figure 5 uses a schema involving nine data points (positions of gaze) at the intersections of the lines as shown by the dots with these points separated by equal vertical and horizontal angular vectors of target position differences. This schema represents the same positions of gaze as the target positions shown diagrammatically in Fig. 4. Other convenient symmetrical arrangements can be used.

Defects resulting from misalignment of one eye relative to the other will comprise vertical and horizontal angular defects, but only the vertical misalignment data for each point will be considered in the illustrative description which follows. Although prism diopters are preferred as the unit of angular divergence deviation other units can be used.

The formulae herein are for prism diopter units.

Fig. 6 shows the diagram of Fig. 5 modified so that each of the squares represents one of the testing points of Fig. 5. The test data, that is, the muscle imbalance, shown by the clinical tests, is written in the squares which represent the particular position of gaze at which that imbalance was measured. As in the case of Fig. 4, Figs. 5–11 are oriented as though they were the patient being looked at, that is, the data for the eyes-right positions of gaze are at the left in these figures, and those for the eyes-left positions of gaze are at the right in the figures.

The test numerals shown in Fig. 6 are illustrative. For example, in the eyes-front position, the data shows the muscle imbalance of two diopters. The plus sign indicates that the gaze of the right eye is higher than that of the left. If the gaze of the left eye is higher, the imbalance is indicated by a minus sign, as previously explained. The imbalance measured with the eyes-front and up is plus three prism diopters, and that measured with the eyes-front and down is plus 1 prism diopter.

The first correction for the spectacle lenses is to correct the center datum point (eyes-front position) to zero prism diopters. This is done straight forwardly by adding a prism correction of the exact amount and opposite sign of the center datum in the proper eye and position according to the sign of the added prism ($D_f$). Thus a plus sign indicates correction needed in the left eye prism base up, and is given by its equal and opposite sign prism. In other words, a minus-prism correction is a prism base up for the left eye, and a plus-prism correction is a prism base up for the right eye. The latter would correct a minus $D_f$. Since this prism addition affects all data points and amounts equally, a new prism-corrected data schema (Fig. 7) is made showing all data of all points changed by addition of the prism used to correct the center datum. The next step is to correct one of the meridians, preferably one of the oblique meridians, such as the 45 or 135° meridian. Fig. 8 shows the way in which the meridians are indicated, the angles being taken in a counter-clockwise direction. All of the radii pass through the center datum point and successive radii are at equal angular spacing from one another.

The meridians which are 180° apart are coincident, and form straight lines. Thus the eight meridians actually become four non-coincident meridians. There are, therefore, two peripheral data points on each of these four non-coincident meridians. These two data points on the same meridian provide the "correction span" for that meridian, and the span is measured in prism diopters and constitutes the difference between the prism diopters indicated for the data points at opposite ends of the meridian.

Fig. 9 shows the correction spans across the different meridians. The span is plus or minus depending upon the direction in which it is measured. In Fig. 9, the less plus of the 45 and 135° spans is that of the 45° meridian. Where $D_0 = D_u - D_d$; that is, $D_0 = -7 - 2 = -9$.

The next step is to correct one of the oblique meridians (45 or 135°) to a zero correction span ($D_0$). For any given prism-corrected data there is only one eikonic lens which will correct the opposite two data points of a given oblique meridian to the same prism diopter resultant amount in both sign quantities. This eikonic lens ($P_0$) is used as an over-all eikonic lens correction affecting equally all meridians.

Fig. 10 shows the data for all positions after an over-all eikonic lens correction has been applied to reduce the correction span of the 45° meridian to zero.

This correction is made by taking one-half of the correction span and adding minus, this quantity to all of the prism diopter data points above the horizontal meridian, and adding plus this quantity to all the data points below the horizontal meridian. The zero and 180° prism diopter data points remain unchanged because they are vertical prism diopter components and are not affected by an over all eikonic lens in those horizontal meridians.

The percent magnification equivalent for this over all eikonic lens correction ($D_0$) is easily found by the following formula:

$$P_0 = \frac{D_0}{2 \tan G_v}$$

Where $D_0$ is the over all eikonic lens correction, as explained above, $G_v$ is the particular equivalent angular horizontal and vertical angular vector by which the data points are separated.

The sign of $P_0$ indicates which eye the correction is to be placed in front of. If $P_0$ is +, the correction should be placed in front of the right eye, and if $P_0$ is — the correction should be placed in front of the left eye.

After this correction of the 45–225° meridian correction span, there remain three other correction spans in three consecutive 45° separated meridians, the values of these spans being shown in Fig. 11. The middle one of these three remaining correction spans is the other oblique meridian ($G_c$). The two correction spans bracketing, or limiting on either side, the span $D_c$ are labeled first according to their relative positive prism diopter span magnitudes. Thus "$D_m$" indicates the more plus diopter span of the two, and "$D_n$" indicates the less plus diopter span of the two. Secondly, they are labeled according to their position of rotation. Thus "$D_t$" indicates the more counterclockwise prism diopter span of the two and "$D_g$" indicates the more clockwise prism diopter span of the two.

Then in order to obtain the oblique meridian eikonic lens ($P_b$) correction in percent magnification required to correct the remaining three correction spans most symmetrically, the following formula is used:

$$P_b = \frac{\left[D_c - \left(\frac{D_m - D_n}{D_m + D_c + D_n}\right)(D_c - D_m)\right]}{\left\{2 \tan\left(\frac{G_v}{\sin 45° + \left[\left(\frac{D_m - D_n}{D_m + D_c + D_n}\right)(45°)\right]}\right)\right\} \left\{\sin^2\left[G_c + \left(\frac{D_t - D_g}{D_g + D_c + D_t}\right)(45°)\right]\right\}}$$

In order to determine the meridian ($G_s$) in degrees in which the meridional eikonic correction ($P_b$) must be placed the following formula is used:

$$G_s = \left[G_c + \left(\frac{D_t - D_g}{D_g + D_c + D_t}\right)(45°)\right]$$

meridian $G_s$ may have any value from 0 to 180°.

With the information thus far, the basic prescription, correction can be determined. It consists in:

$P_0$ combined with $P_b$ in meridian $G_s$ and also combined with $D_t$ base up or $P_0$ combined with $P_b$ in axis ($G_s - 90°$) and also combined with $D_t$ base up where:

$P_0$ is the eikonic lens over all magnification, in percent, $P_b$ is the eikonic lens meridional magnification, in percent, $D_t$ is the number of prism diopters vertical prism diopter correction for the original center datum, and is base up to meet the sign convention.

$G_s$ is the number of degrees of the meridian in which the meridional eikonic lens correction ($P_b$) must go.

Sign convention: for $D_t$, $P_0$, and $P_b$, plus indicates correction placed in the right eye, and minus indicates correction placed in the left eye.

These basic anisotonic corrections may be combined with a refractive (power) correction, if one is needed. Some compromise is necessary when the axes of the meridional eikonic lens and the refractive cylinder do not correspond, or are not 90° apart. Sometimes the anisotonic correction leaves some choice as to the correction for either eye, the problem being to balance the eyes. When there is such a choice between the eyes, this sometimes permits comprises that help in combining a refractive correction with the anisotonic correction.

For example, letting $D_t$ remain the same, it is possible to shift the meridional eikonic correction from one eye to the other.

Given, $+P_0$ combined with $P_b$ axis $G_s$ combined with $D_t$

Then to change $P_b$ from the right eye to the left eye, the correction would become $+P'_0$ combined with $-P_b$ axis $(G_s - 90°) + D_t$ where $+P'_0$ indicates a magnification (over all eikonic), and it is equal to the original $P_0 + P_b$ for the right eye. It will be apparent that other combinations are available.

The actual total torsion difference between the images of the right and left eyes produced by the basic anisotonic correction can be calculated exactly by formulae, but for practical purposes a simplified formula giving approximate torsion differences is used with the basic anisotonic correction, and it requires that the prescription be converted to one having its meridional eikonic correction in the right eye. This formula is:

$$T_s = \left[\frac{P_b (\cot G_s)}{P_b + 100 (\csc^2 G_s)}\right]$$

where $T_s$ = the torsion difference in degrees, $P_b$ and $G_s$ are as previously defined, except that $P_b$ must be plus.

The torsion between the images of the two eyes ($T_s$), as determined by the above formula, can be used to calculate the actual tilt ($T_t$) of the stereosopically perceived image combinations of stereoscopic targets. There is a choice of two formulae:

$$\tan T_t = \left[\frac{P_b (\cot G_s)}{P_b + 100 (\csc^2 G_s)}\right]\left[\frac{b}{2a}\right]$$

or $$T_t = \arctan \frac{(T_s)(b)}{2a}$$

where:

$T_t$ is the angle of tilt from the frontal plane, thru the object,
$b$ is the apparent object distance,
$a$ is one-half of the interpupillary distance of the observer,
$P_h$ is the meridional eikonic correction, in percent, and
$G_s$ is the meridian of the meridional eikonic correction, in degrees.

The theoretical torsion and tilt, as calculated by the above equations, does not always correspond with the conditions perceived by the patient. When such is the case a compromise is used in which emphasis is placed as indicated by clinical judgment. Sometimes tilt can be entirely ignored, or conversely it may be desired to correct it fully, as perceived by the observer. These results may be achieved also by use of the transformation chart shown in Figure 12.

The preferred embodiment of the invention has been described and some modifications have been suggested. Other modifications and changes can be made without departing from the invention as defined in the claims.

What is claimed is:

1. In the determination of an advantageous lens prescription for compensating muscle imbalance of the eyes, the method which comprises exhibiting different display targets in front of the respective eyes of a patient, shielding each target from the other eye so that it can be seen by only one eye, also shielding the eyes from the vision of any and all discreet points which the eyes could fuse in a meridian in which muscle imbalance is to be determined so that the eyes are maintained in positions of rest in at least that meridian, measuring the muscle imbalance of the patient with the display targets so exhibited and separately and successively in different meridians at right angles to one another and for various positions of gaze in each of said meridians, compensating by an overall prism correction any imbalance in the eyes front position of gaze which prism correction alters the imbalance in the other positions of gaze equally, compensating the imbalance for at least one meridian by an overall eikonic lens correction equal to one half of the difference of the muscle imbalance as measured in the positions of gaze at opposite ends of that meridian, and compensating by a meridianal eikonic lens correction the imbalance in another meridian, different from that for which the overall eikonic lens correction is taken whereby the prescription data obtained provides for imbalance in peripheral positions of gaze.

2. In the determination of an advantageous lens prescription for compensating muscle imbalance of the eyes, the method which comprises exhibiting different display targets in front of the respective eyes of a patient, shielding each target from the other eye so that it can be seen by only one eye, also shielding the eyes from the vision of any and all discreet points which the eyes could fuse in the vertical meridian so that the eyes are maintained in positions of rest in the vertical meridian, measuring the muscle imbalance of the patient in that meridian with the targets exhibited as indicated and for various positions of gaze including the positions of gaze in the 45 and 135° diagonal meridians, compensating any imbalance in the eyes front position of gaze by an overall prism correction which alters the imbalance in the other positions of gaze equally, and then compensating the imbalance of one diagonal meridian by an overall eikonic lens correction equal to one half of the difference of the muscle imbalance as measured in the positions of gaze at opposite ends of that meridian, and compensating by a meridianal eikonic lens correction, the imbalance in another meridian, different from that for which the overall eikonic lens correction is taken, whereby the prescription data obtained provides for imbalance in peripheral positions of gaze.

3. The method described in claim 2, and in which the meridianal eikonic lens correction in the meridian different from that in which the overall eikonic correction was taken is made in the meridian which produces a symmetrical compensation of the remaining muscle imbalance.

4. The method described in claim 3 and in which the overall eikonic lens correction is taken from the meridian having the less plus span and the meridianal eikonic lens correction is in the meridian determined by the formula $$G_s = \left[ G_c + \left( \frac{D_t - D_g}{D_g + D_c + D_t} \right)(45°) \right]$$

where $G_c$ is the diagonal meridian (45° or 135°) other than that for which the overall eikonic correction was taken; $D_t$ is the more counterclockwise prism diopter span of the remaining two meridians; $D_g$ is the more clockwise prism diopter span of said remaining two meridians and $D_c$ is the prism diopter span of the meridian $G_c$.

References Cited in the file of this patent

UNITED STATES PATENTS

| | | |
|---|---|---|
| 1,933,578 | Ames et al. | Nov. 7, 1933 |
| 1,954,399 | Ames | Apr. 10, 1934 |
| 2,077,134 | Tillyer | Apr. 13, 1937 |
| 2,118,132 | Ames et al. | May 24, 1938 |
| 2,118,173 | Dittmer | May 24, 1938 |
| 2,124,457 | Ames et al. | July 19, 1938 |
| 2,131,232 | Ogle | Sept. 27, 1938 |
| 2,376,554 | Ranoe | May 22, 1945 |

OTHER REFERENCES

Ogle: Article in Archives of Ophthalmology, vol. 22, December 1939, pages 1046–1056, 1065, 1066.

Burian et al.: Article in Archives of Ophthalmology, vol. 33, April 1945, pages 293–309.

Bielschowsky: Article in American Journal of Ophthalmology, vol. 18, No. 10, October 1935, pages 925–937.